US008252179B2

(12) United States Patent
Aoki et al.

(10) Patent No.: US 8,252,179 B2
(45) Date of Patent: Aug. 28, 2012

(54) SOLID-LIQUID SEPARATOR

(75) Inventors: Kazuyoshi Aoki, Yokohama (JP); Yasushi Yamamoto, Yokohama (JP); Takashi Menju, Kawasaki (JP); Mii Fukuda, Tokyo (JP); Atsushi Yukawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 538 days.

(21) Appl. No.: 12/541,017

(22) Filed: Aug. 13, 2009

(65) Prior Publication Data

US 2010/0069217 A1 Mar. 18, 2010

(30) Foreign Application Priority Data

Sep. 16, 2008 (JP) ................................ P2008-236745

(51) Int. Cl.
*B01D 21/26* (2006.01)
*B01D 35/06* (2006.01)

(52) U.S. Cl. .................... 210/223; 210/512.1; 209/12.1; 209/733

(58) Field of Classification Search .................. 210/223, 210/512.1; 209/12.1, 733
See application file for complete search history.

(56) References Cited

U.S. PATENT DOCUMENTS

| | | | | |
|---|---|---|---|---|
| 453,105 | A * | 5/1891 | Bretney | 210/512.1 |
| 3,235,090 | A * | 2/1966 | Bose et al. | 210/512.1 |
| 3,489,286 | A * | 1/1970 | Estabrook | 210/512.1 |
| 6,540,918 | B2 * | 4/2003 | Gil et al. | 210/512.1 |

FOREIGN PATENT DOCUMENTS

| | | |
|---|---|---|
| CN | 201006495 | 1/2008 |
| JP | 50-134074 | 4/1974 |
| JP | 51-50466 | 10/1974 |
| JP | 52-79370 | 7/1977 |
| JP | 57-100741 | 12/1980 |

(Continued)

OTHER PUBLICATIONS

First Office Action issued by the Chinese Patent Office on Nov. 9, 2010, for Chinese Patent Application No. 200910165769.8, and English-language translation of main text thereof.

(Continued)

*Primary Examiner* — David A Reifsnyder
(74) *Attorney, Agent, or Firm* — Finnegan, Henderson, Farabow, Garrett & Dunner, L.L.P.

(57) ABSTRACT

A liquid cyclone is configured for inflowing raw water containing impurities as targets of collection to be forced to swirl inside to spin down impurities contained in raw water, an inflow pipe is connected with an upper portion of the liquid cyclone to supply the liquid cyclone with raw water, and configured for supplied raw water to be forced to swirl inside the liquid cyclone, a connecting portion is connected with a lower portion of the liquid cyclone, and configured with a discharge port to discharge spun down impurities from the liquid cyclone, an impurity collector is connected to the liquid cyclone with the connecting portion in between, and configured to collect impurities discharged from the liquid cyclone, an obstacle is disposed in or near the discharge port, , and configured to prevent impurities collected in the impurity collector from backing up into the liquid cyclone, and an outflow pipe is connected with a top portion of the liquid cyclone, and configured for raw water having got rid of impurities to outflow as treated water from the liquid cyclone, whereby impurities separated from raw water is prevented from being re-mixed in raw water, allowing for an enhanced separation performance.

13 Claims, 15 Drawing Sheets

FOREIGN PATENT DOCUMENTS

| | | |
|---|---|---|
| JP | 59-127757 | 8/1984 |
| JP | 5-9656 | 2/1993 |
| JP | 5-104033 | 4/1993 |
| JP | 11-267437 | 10/1999 |
| JP | 11-333320 | 12/1999 |
| JP | 2001-221031 | 8/2001 |
| JP | 2002-66387 | 3/2002 |
| JP | 2003-327328 | 11/2003 |
| JP | 2004-275800 | 10/2004 |
| JP | 2005-28244 | 2/2005 |
| JP | 2005-230634 | 9/2005 |
| JP | 2006-205168 | 8/2006 |
| JP | 2007-253048 | 10/2007 |

OTHER PUBLICATIONS

Notice of Reasons for Refusal issued by the Japanese Patent Office on Jun. 8, 2010, for Japanese Patent Application No. 2008-236745, and English-language translation thereof.

* cited by examiner

FIG. 16A
FIG. 16B
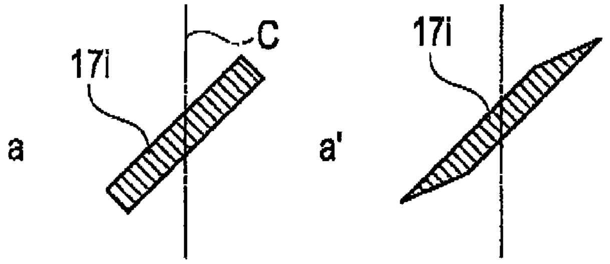
FIG. 16C
FIG. 16D
FIG. 16E
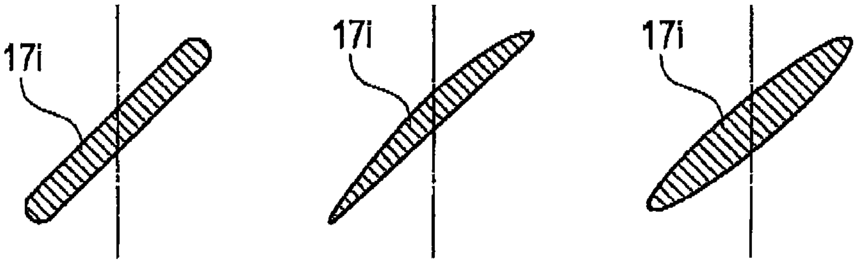
FIG. 17
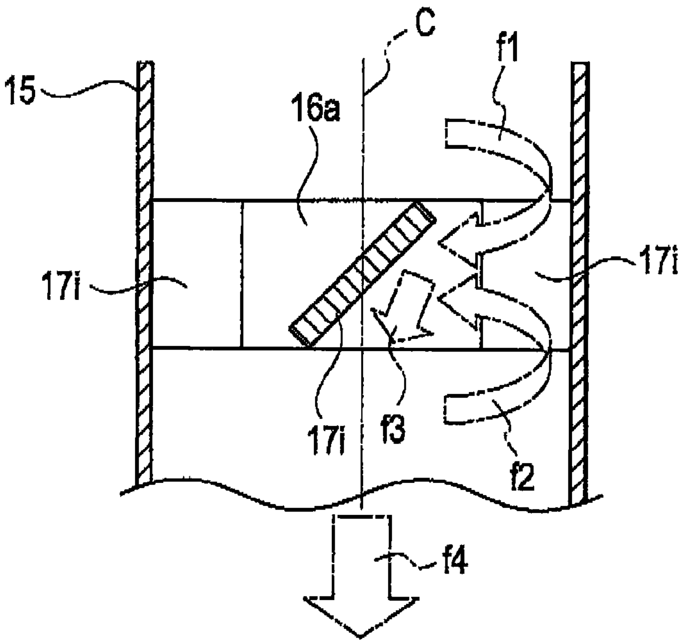

SOLID-LIQUID SEPARATOR

CROSS REFERENCE TO RELATED APPLICATIONS

The present application claims the benefit of priority under 35 U.S.C. §119 to Japanese Patent Application No. 2008-236745, filed on Sep. 16, 2008, the entire contents of which are incorporated herein by reference.

BACKGROUND OF THE INVENTION

1. Field of Art

The present invention relates to a solid-liquid separator for separating impurities to be collected from raw water.

2. Description of Relevant Art

Water treatment employs in a process thereof a solid-liquid separation treatment such as a gravitational settling, flocculation sedimentation, or dissolved air flotation.

In the gravitational settling or flocculation sedimentation, raw water inflows to a settling tank, where impurities contained in raw water as targets of collection heavier in specific gravity than water are settled by use of differences in specific gravity between water and impurities, and a supernatant is taken as treated water, whereby raw water is separated into impurities and treated water. In this case, the settling rate is varied in accordance with impurities' specific gravity, size, etc. For instance, for impurities relatively small in settling rate, the settling rate is raised by increase in volume of the settling tank, or the settling efficiency is raised by use of an inclined plate or inclined pipes for enhancing the settling rate. However, even with such a rise in settling efficiency by use of an inclined plate or inclined pipes, there is an issue of the residence time still requiring one hour or more, because of the limit in reduction of residence time, as well as the size in volume of settling tank.

In the dissolved air flotation, for buoyant impurities such as fat or solid materials relatively light in specific gravity, air is pressured to dissolve in recirculating separated water or the like, which is let to inflow to a separation tank, where microscopic bubbles are formed and attached to impurities to surface for separation, whereby raw water is separated into impurities and treated water. For the dissolved air flotation, impurities with adherent bubbles have a surfacing speed of 200 mm/min or less. Therefore, dissolved air flotation also needs a long time for treatment, as an issue.

For reduction of the treatment time having been a problem in gravitational settling or dissolved air flotation in the past, there is a method disclosed in Japanese Patent Application Laid-Open Publication No. 11-333320, in which raw water is swirled in a container to separate impurities by use of centrifugal forces.

In the method of swirling raw water as disclosed in Japanese Patent Application Laid-Open Publication No. 11-333320, swirling streams should have high speeds to produce strong centrifugal forces, and impurities once separated are caused to roll up by high speeds, with a potential re-making to treated water, as an issue.

For prevention of the re-mixing of impurities, there is a technique disclosed in Japanese Utility Model Registration Application Laid-Open Publication No. 5-9656, which produces swirling streams in a container of a double-cylinder structure with an inner cylinder made of a porous material or as a filter.

There is also a technique disclosed in Japanese Patent Application Laid-Open Publication No. 2002-66387, which includes a container for producing swirling streams, and has a nozzle provided to a lower portion of the container for discharging impurities, and adapted to function as a check valve made of an elastic material.

However, the provision of a doubled container is unable to cope with a potential re-mixing of impurities due to a roll-up in a central region of the container. The provision of an elastic check valve constitutes, if the elasticity is too high, a difficulty for impurities to pass through, resulting in an insufficient collection of impurities, and if the elasticity is too low, a marred function of check valve, resulting in a damage on check valve while running.

The present invention has been devised in view of such issues, and it is an object of the present invention to provide a liquid-solid separator adapted to prevent impurities separated from raw water from being re-mixed in raw water, allowing for an enhanced separation performance.

SUMMARY OF THE INVENTION

According to an aspect of the present invention, a solid-liquid separator is adapted for raw water supplied to separate into impurities and treated water, and comprises a liquid cyclone configured for inflowing raw water containing impurities as targets of collection to be forced to swirl aside to spin down impurities contained in raw water, an inflow pipe connected with an upper portion of the liquid cyclone to supply the liquid cyclone with raw water and configured for supplied raw water to be forced to swirl inside the liquid cyclone, a connecting portion connected with a lower portion of the liquid cyclone, and configured with a discharge port to discharge spun down impurities from the liquid cyclone, an impurity collector connected to the liquid cyclone with the connecting portion in between, and configured to collect impurities discharged from the liquid cyclone, an obstacle disposed in or near the discharge port, and configured to prevent impurities collected in the impurity collector from backing up into the liquid cyclone, and an outflow pipe connected with a top portion of the liquid cyclone, and configured for raw water having got rid of impurities to outflow as treated water from the liquid cyclone.

BRIEF DESCRIPTION OF THE DRAWINGS

FIG. 16A to FIG. 16E are sectional views of modified examples of obstacle holders of the solid-liquid separator of FIG. 14.

FIG. 17 is a longitudinal sectional view of a connecting portion of the solid-liquid separator of FIG. 14, with imaginary streamlines of impurities.

DETAILED DESCRIPTION OF THE EMBODIMENTS

Figure 1:
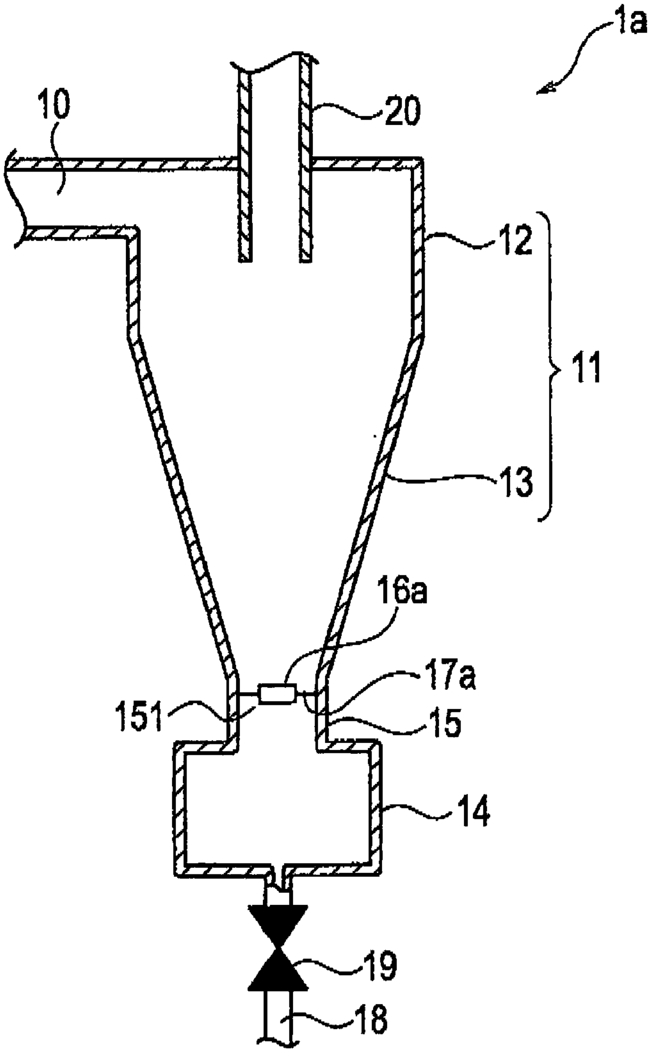
FIG. 1 is a longitudinal sectional view of a solid-liquid separator according to a first embodiment of the present invention.

There will be described solid-liquid separators according to embodiments of the present invention, with reference to the accompanying drawings. In the drawings, like elements are designated by like reference characters, omitting redundant description.

(First Embodiment)

FIG. 1 illustrates a solid-liquid separator 1*a* according to a first embodiment of the present invention, which includes: a liquid cyclone 11 configured for raw water containing impurities as solid targets of collection to inflow therein to be swirled inside thereof to spin down impurities the raw water contain; an inlet or inflow pipe 10 connected with a cylindrical upper portion 12 of the liquid cyclone 11 to supply the liquid cyclone 11 with raw water, and configured for raw water being supplied to be guided to swirl inside the liquid cyclone 11; a short cylindrical connecting portion 15 integrated at an upper end thereof with a conical or tapered lower portion 13 of the liquid cyclone 11 and configured to define a discharge port 151 for discharging impurities spun down by the liquid cyclone 11; a short cylindrical impurity collector 14 integrated with a lower end of the connecting portion 15 and configured for collection of impurities discharged from the discharge port 151; an obstacle 16*a* disposed in or near the discharge port 151 to baffle or prevent impurity-carrying countercurrents from backing up from the impurity collector 14 again inside the liquid cyclone 11; and an outlet or outflow pipe 20 inserted through a top wall of the liquid cyclone 11 and configured for raw water having got rid of impurities to outflow as treated water from the liquid cyclone 11. It is noted that the liquid cyclone 11, the impurity collector 14, and the connecting portion 15 in between are all coaxially arranged.

The impurity collector 14 has a discharge line 18 connected to a central outlet at a bottom thereof for discharging collected impurities, and the discharge line 18 has a valve 19 installed therein.

As illustrated in FIG. 1, the liquid cyclone 11 is composed of the cylindrical portion 12 and the taper portion 13 inclined relative to the cylindrical portion 12, and configured for raw water incoming from the inflow pipe 10 to be caused to swirl inside thereof. As raw water swirls in the liquid cyclone 11, such impurities that are suspended in raw water and heavier in specific gravity than water are forced outwards by centrifugal forces acting thereon, and spun down along the wall of the taper portion 13, so they pass through the discharge port 151 of the connecting portion 15, and enter the impurity collector 14, where they are collected.

Figure 2:
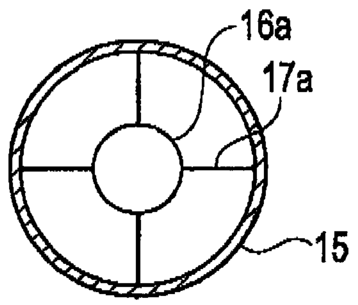
FIG. 2 is a cross-sectional view of a connecting portion of the solid-liquid separator of FIG. 1, with appearance of an obstacle.

As illustrated in FIG. 1 and FIG. 2, the connecting portion 15 has the obstacle 16*a* held thereto by a holder 17*a*. The obstacle 16*a* is a circular planer member held horizontal by the holder 17*a* made of wire elements secured to the wall of the connecting portion 15, and co-centered with the discharge port 151, so the obstacle has a center thereof on a center axis of the liquid cyclone 11. The obstacle 16*a* has a thickness determined in consideration of probable swirling power of raw water, tensile forces of the holder 17*a*, etc. This thickness is not limited, but too thin obstacle might be broken by power of row water.

As discussed above, impurities being forced outwards are spun down along the wall of the connecting portion 15, so they pass through spaces between the obstacle 16*a* and the connecting portion 15, to be collected inside the impurity collector 14.

The impurity collector 14 collects impurities together with raw water. In the impurity collector 14, collect water moves, so collected impurities flow, rolling or backing up, with potentials to run again into raw water in the liquid cyclone 11, as an issue. However, as illustrated in FIG. 1, the obstacle 16*a* stands between the liquid cyclone 11 and the impurity collector 14, whereby collected impurities in the impurity collector 14 are effectively prevented from running again into raw water in the liquid cyclone 11. In particular, collected impurities tend to roll up near the center axis of the liquid cyclone 11, with an increased potential re-mixing of impurities, which can be effectively prevented by the obstacle 16*a* arranged near the center axis.

According to the first embodiment, a solid-liquid separator 1*a* includes a liquid cyclone 11 for swirling raw water, and an impurity collector 14 for collecting impurities, with an obstacle 16*a* disposed in between, thereby preventing a re-mixing of up-rolled impurities.

(First Modification of the First Embodiment)

Figure 3:
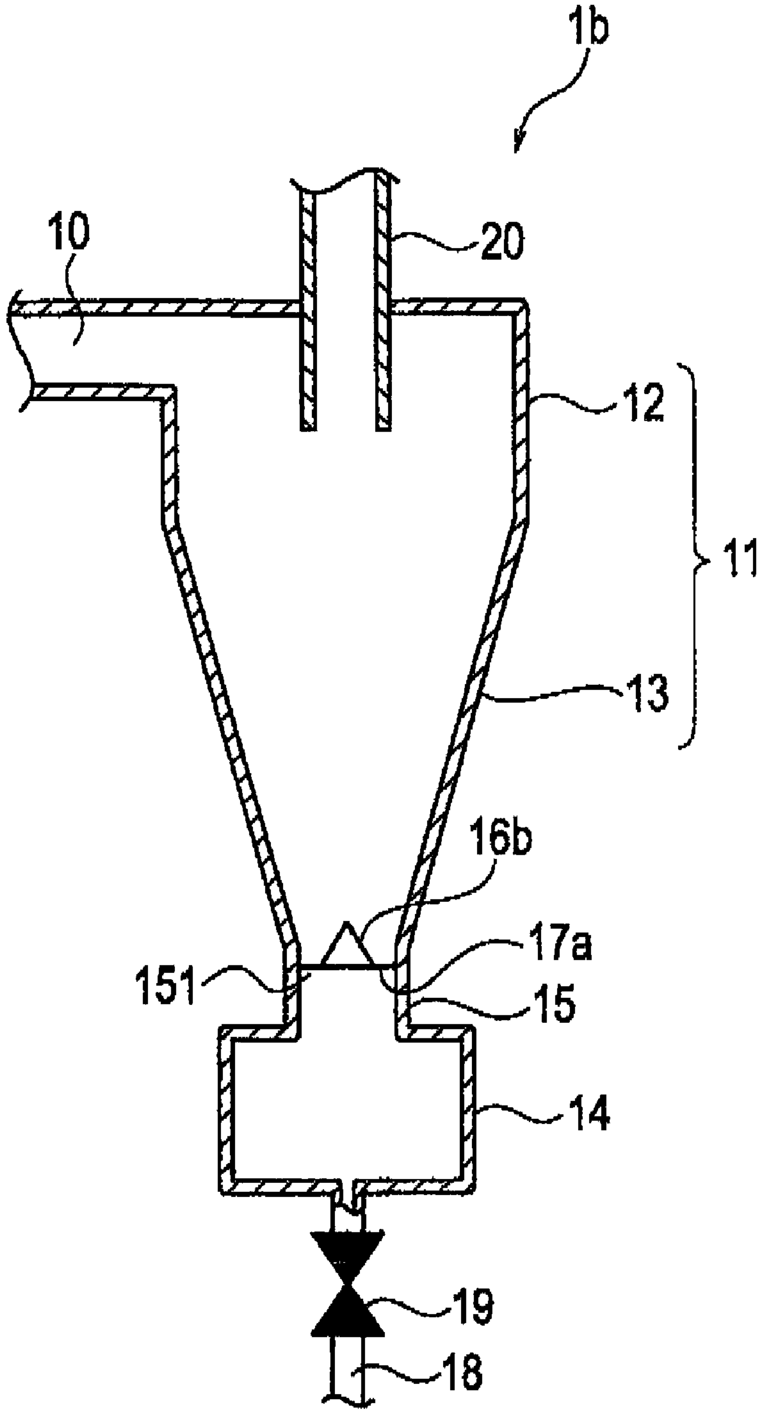
FIG. 3 is a longitudinal sectional view of a solid-liquid separator according to a first modification of the fist embodiment of the present invention.

Description is now made with reference to FIG. 3 of a solid-liquid separator 1*b* according to a first modification of the first embodiment. As illustrated in FIG. 3, the solid-liquid separator 1*b* is different from the solid-liquid separator 1*a* of FIG. 1, in that it has a conical obstacle 16*b* substituting for the circular obstacle 16*a*. The obstacle 16*b* also is held by a holder 17*a* made of wire elements secured to a connecting portion 15.

Down-spinning impurities being forced outward with centrifugal forces acting thereon have their weights and swirling speeds, and may well be settled on an obstacle, where they might have been accumulated if the obstacle were such a circular obstacle 16 as illustrated in FIG. 2. To this point the conical obstacle 16*b* has an inclined lateral face serving for impurities to slide down toward an impurity collector 14 with an increased tendency, and can prevent accumulation of impurities on the obstacle 16*b*, allowing for a promoted collection of impurities at the impurity collector 14.

(Second Modification of the First Embodiment)

Figure 4:
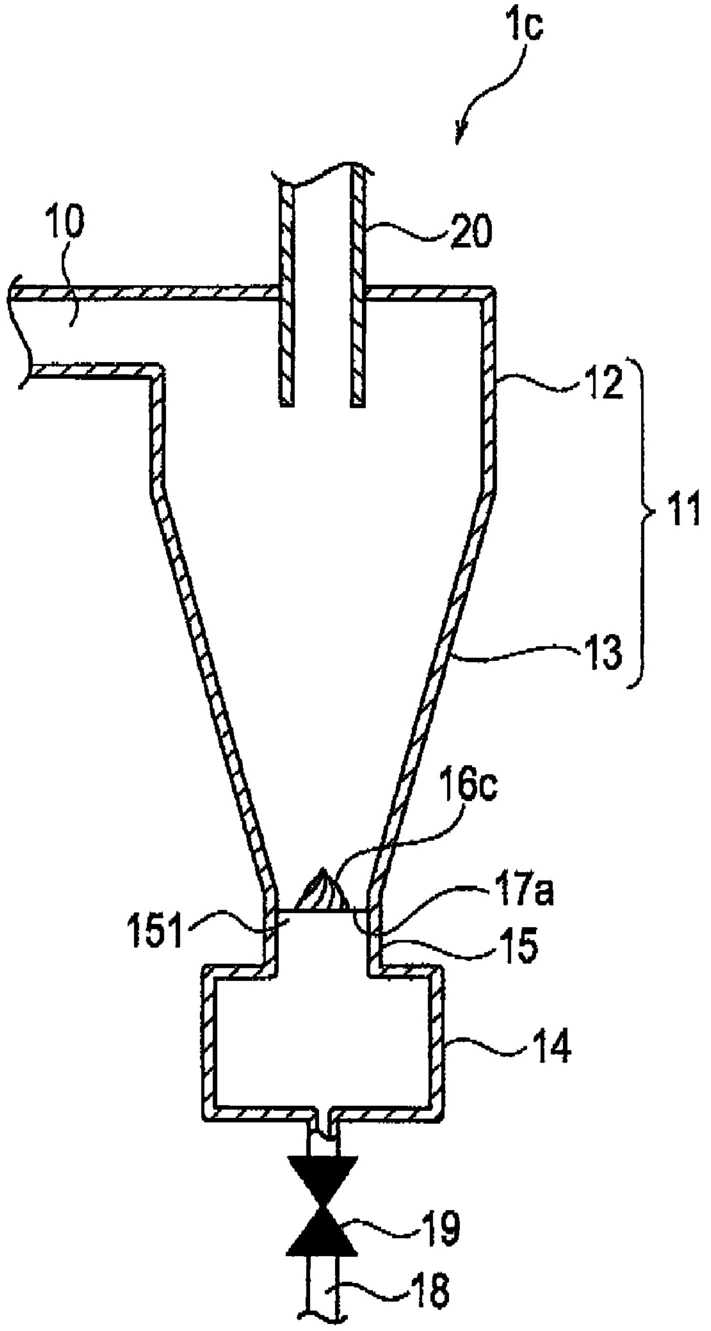
FIG. 4 is a longitudinal sectional view of a solid-liquid separator according to a second modification of the first embodiment of the present invention.
Figure 5A:
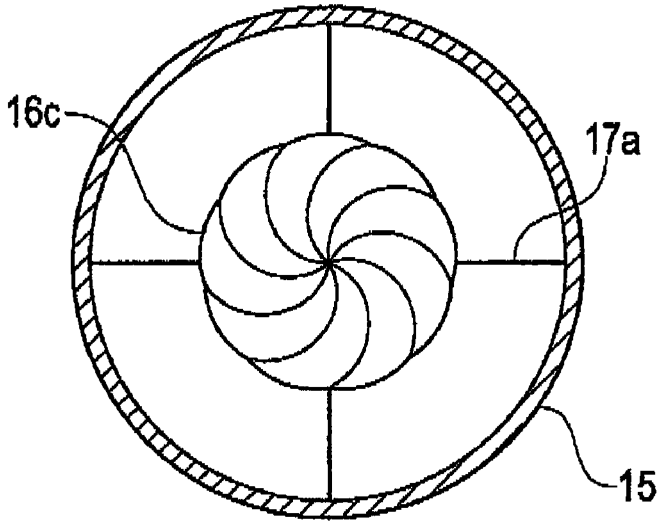
FIG. 5A is a cross-sectional view of a connecting portion of the solid-liquid separator of FIG. 4, with appearance of an obstacle, and FIG. 5B, a perspective view of the obstacle.
Figure 5B:
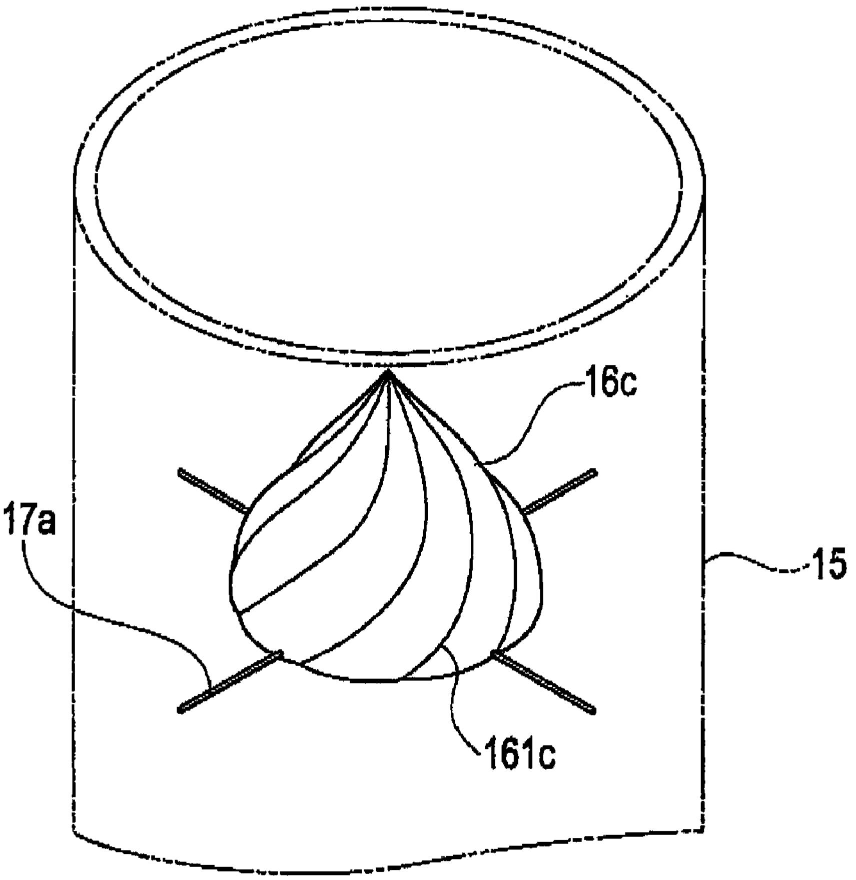

Description is now made with reference to FIGS. 4, 5A, and 5B of a solid-liquid separator 1*c* according to a second modification of the first embodiment. As illustrated in FIG. 4, the solid-liquid separator 1*c* is different from the solid-liquid separator 1*a* of FIG. 1, in that it has a conical obstacle 16*c* formed with spiral grooves 161*c* substituting for the circular obstacle 16*a*. The obstacle 16*c* also is held by a holder 17*a* made of wire elements secured to a connecting portion 15.

Down-spinning impurities being forced outward with centrifugal forces acting thereon have their weights and swirling speeds, and may well be settled on an obstacle, where they might have been accumulated if the obstacle were such a circular obstacle 16 as illustrated in FIG. 2. To this point, the conical obstacle 16*c* has an inclined lateral face with spiral grooves 161*c* cut therein serving for impurities to slope down toward an impurity collector 14 with an increased tendency, and can prevent accumulation of impurities on the obstacle 16*c*, allowing for a promoted collection of impurities at the impurity collector 14.

(Third Modification of the First Embodiment)

Figure 6:
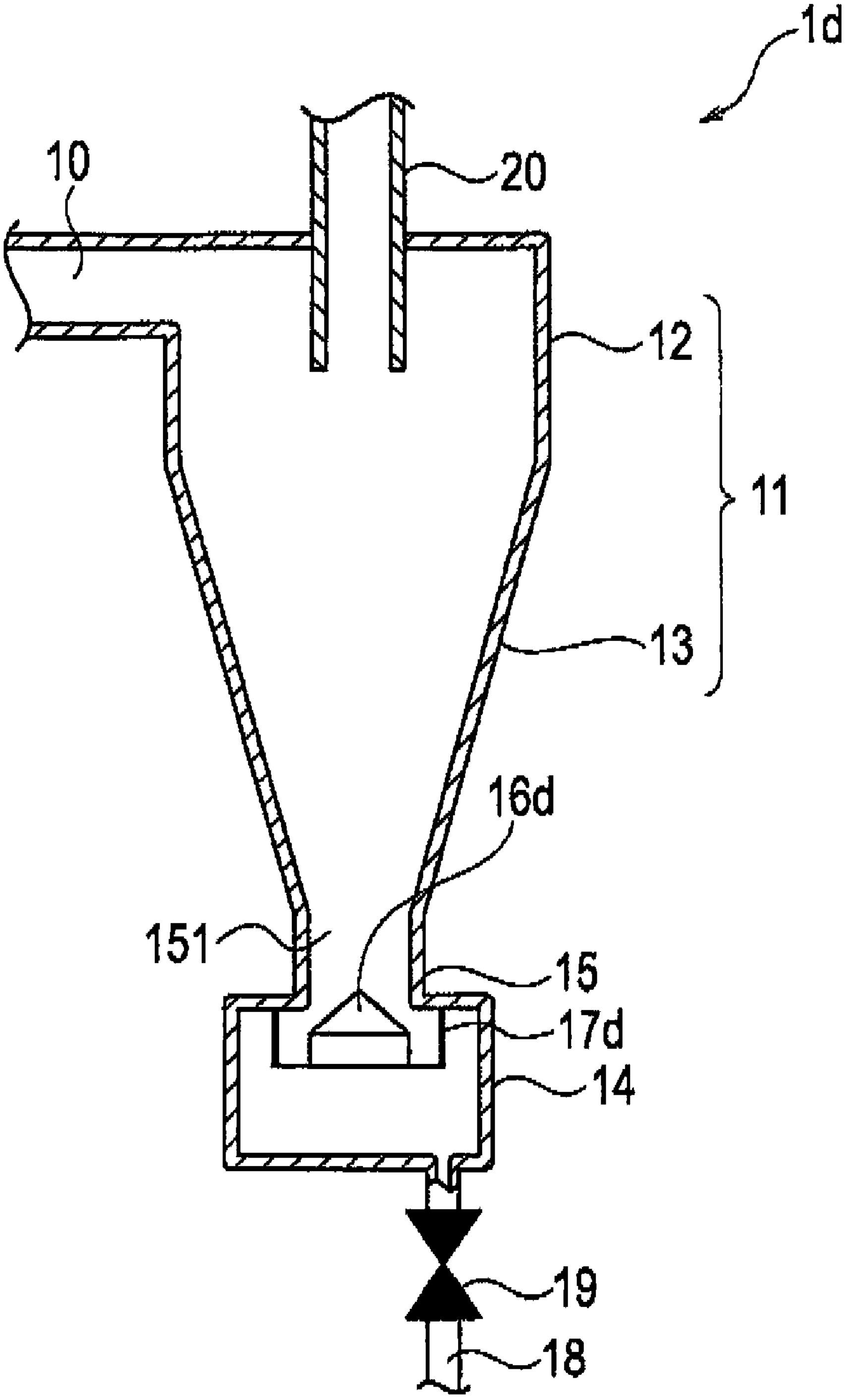
FIG. 6 is a longitudinal sectional view of a solid-liquid separator according to a third modification of the first embodiment of the present invention.
Figure 7A:
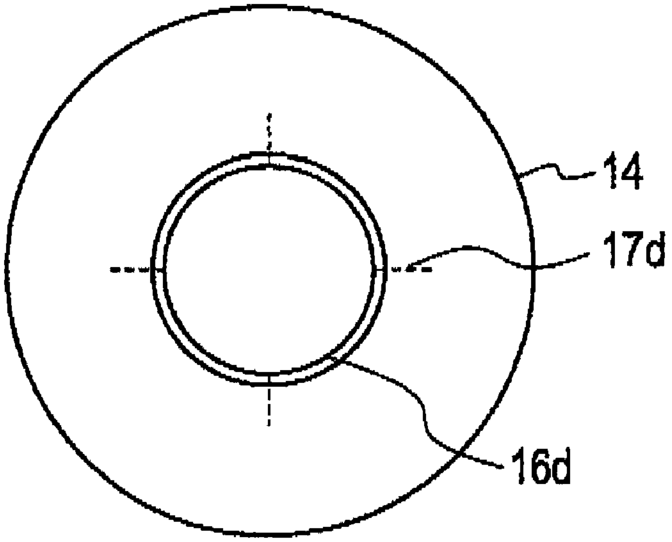
FIG. 7A is a cross-sectional view of a connecting portion of the solid-liquid separator of FIG. 6, with appearance of an obstacle, and FIG. 7B, a perspective view of the same.
Figure 7B:
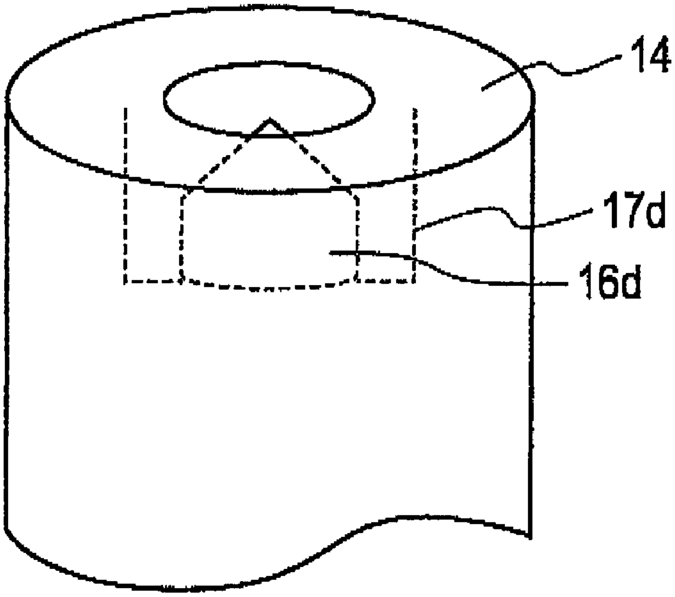

Description is now made with reference to FIGS. 6, 7A, and 7B of a solid-liquid separator 1*d* according to a third modification of the first embodiment. As illustrated in FIG. 6, the solid-liquid separator 1*d* is different from the solid-liquid separator 1*a* of FIG. 1, in that it has an obstacle 16*d* suspended by a holder 17*d*, not from the wall of a connecting portion 15, but from a top wall of an impurity collector 14. The holder 17*d* is configured like a cradle in a different form relative to the holder 14*a*, while it is made up by wire elements like the holder 14*a*.

The solid-liquid separator 1*d* in f FIG. 6 is still different from the solid-liquid separator 1*a* of FIG. 1, in that the obstacle 16*d* is formed, unlike the circular planer obstacle 16*a*, as a cylindrical obstacle provided with a conical top portion.

The holder 17*d* has a flat receiver portion for the obstacle 16*d* to be placed thereon, and a suspender portion for suspending the receiver portion. If the suspender portion were long, the obstacle 16 on the receiver portion would oscillate with ease. Therefore, the suspender portion is set short, and the obstacle is given a small height, to thereby render the obstacle 16*d* stable.

There is a liquid cyclone 11 in which spiral swirling flow of impurity-containing raw water is displaced in a vertical direction, whereto the suspender portion of the holder 17*d* extends in parallel, whereby the holder 17 is the less exposed to power of swirling flow, and has an enhanced durability. The conical top portion of the cylindrical obstacle 16 has a slope ending on a cylindrical obstacle face, which prevents accumulation of impurities on the obstacle 16*d*.

The conical top portion of the cylindrical obstacle 16 has an aspect ratio set up by adjustments of, among others, slope inclination and bottom diameter, for a facilitated collection of impurities at the impurity collector 14. Adjustments are made also of spacing distances between the connecting portion 15 and the obstacle 16, for enhanced effects on the prevention against roll-up of impurities from the impurity collector 14 to the liquid cyclone 11.

(Second Embodiment)

Figure 8:
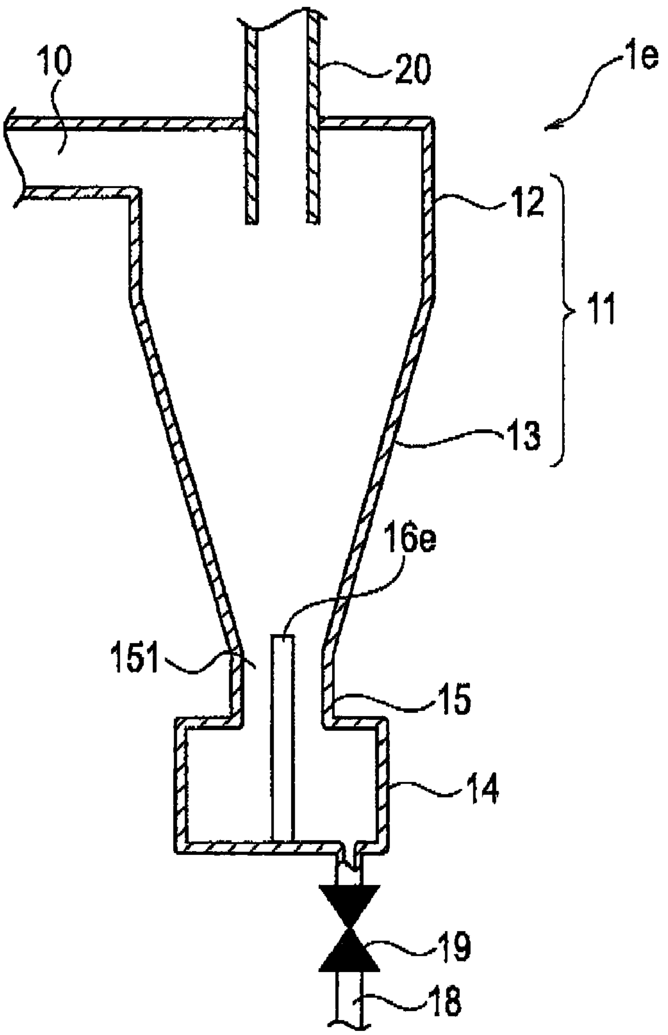
FIG. 8 is a longitudinal sectional view of a solid-liquid separator according to a second embodiment of the present invention.
Figure 9:
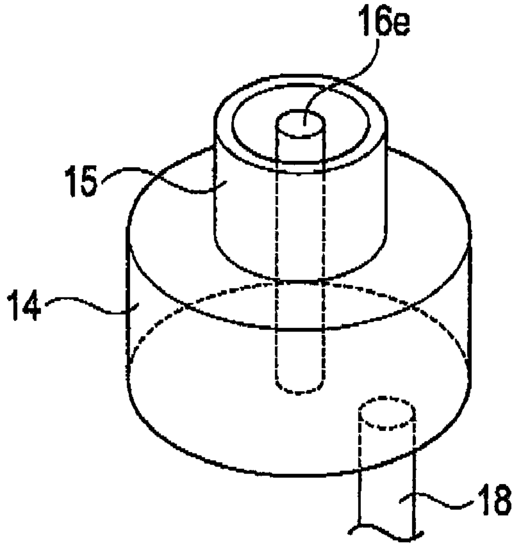
FIG. 9 is a perspective view of an essential portion of the solid-liquid separator of FIG. 8, with appearance of an obstacle.

Description is now made with reference to FIGS. 8 and 9 of a solid-liquid separator 1*e* according to a second embodiment of the present invention. As illustrated in FIG. 8, the solid-liquid separator 1*e* is different from the solid-liquid separator 1*a* of FIG. 1, in that it has, in place of the obstacle 16*a* held by the holder 17*a*, a bar-shaped cylindrical obstacle 16*e* erected upright on a bottom wall of an impurity collector 14.

There is a liquid cyclone 11 in which raw water incoming from an inflow pipe 10 swirls, with power producing forces that would have acted on, among others, the obstacle 16*a* and the holder 17*a* During a long service exposed to such power, the obstacle 16*a* as well as the holder 17*a* might have become easy to break. To this point, as illustrated in FIG. 8 and FIG. 9, the obstacle 16*e* now employed is formed in an elongate cylindrical shape that should be kept hard to break even in exposure to flow of raw water.

The obstacle 16*e* has a center axis thereof coincident with a center axis of the liquid cyclone 11. Impurities are collected in an impurity collector 14, where they tend to axially roll up at the center of the impurity collector 14, where the obstacle 16*e* is erected for an effective prevention against a re-mixing of impurities. The obstacle 16*e* is coaxially arranged to the collector 14, and an outlet at the bottom of the collector 14 is offset relative to the center axis, for connection with a discharge line 18.

According to the second embodiment, in a solid-liquid separator 1*e*, an obstacle 16*e* erected in an impurity collector 14 is extended inside a discharge port 151, thereby enabling a prevention against a re-mixing of up-rolled impurities, allowing for an enhanced durability of the obstacle 16*e*.

The obstacle 16*e* may have a top end thereof curved or formed with grooves for a promoted introduction of impurities to the impurity collector 14. The obstacle 16*e* may have a modified shape, such as a conical shape, to prevent accumulation of impurities thereon.

(Third Embodiment)

Figure 10:
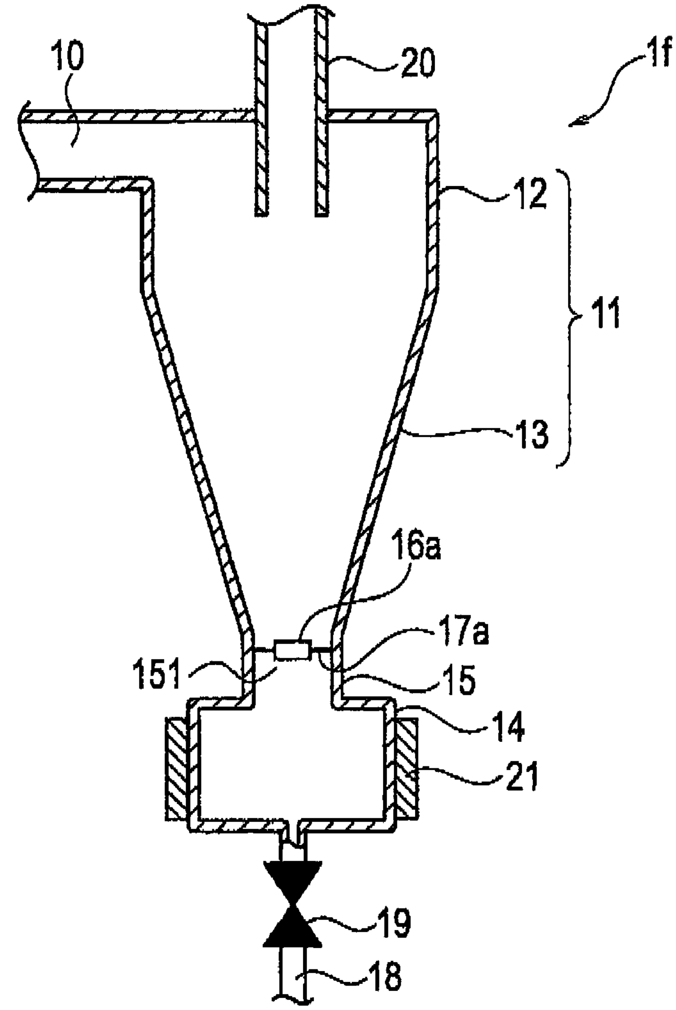
FIG. 10 is a longitudinal sectional view of a solid-liquid separator according to a third embodiment of the present invention.
Figure 11:
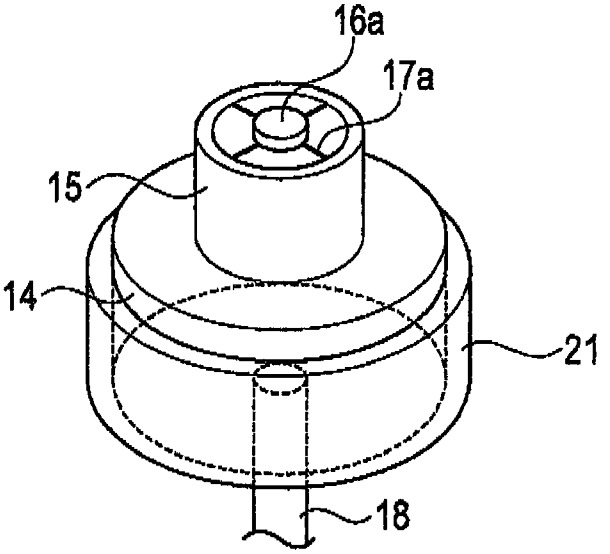
FIG. 11 is a perspective view of an essential portion of the solid-liquid separator of FIG. 10, with appearance of a magnet.

Description is now made with reference to FIGS. 10 and 11 of a solid-liquid separator if according to a third embodiment of the present invention. As illustrated in FIG. 10, the solid-liquid separator 1*f* is different from the solid-liquid separator 1*a* of FIG. 1, in that it has a magnet (or a loop of magnets) 21 arranged over an outer periphery of an impurity collector 14.

Assuming impurities separated from raw water by the solid-liquid separator 1*f* as magnetically attractive metallic impurities, when having entered an impurity collector 14, they are attracted by magnetic forces, and remain inside the impurity collector 14, with an enhanced effect on the prevention against a re-mixing into raw water in a liquid cyclone 11.

As the collection of impurities extends over a long term, there appears an increasing quantity of impurities attracted by the magnet 21 and accumulated on the wall of the impurity collector 14. However, the magnet 21 has a preset limit of magnetic forces, which is exceeded before the impurity collector 14 becomes filled with impurities. Once the limit is exceeded, a discharge line 18 serves to discharge an exceeding quantity of impurities. As impurities are accumulated much on the wall of the impurity collector 14, the impurity collector 14 has a decreased amount of impurities flowing inside, with a suppressed roll-up of impurities, allowing for a prevented re-mixing of impurities to raw water in the liquid cyclone 11.

According to the third embodiment, in a solid-liquid separator 1*f*, an impurity collector 14 has a magnet 21 arranged therearound, allowing for a prevented re-mixing of impurities.

(Fourth Embodiment)

Figure 12:
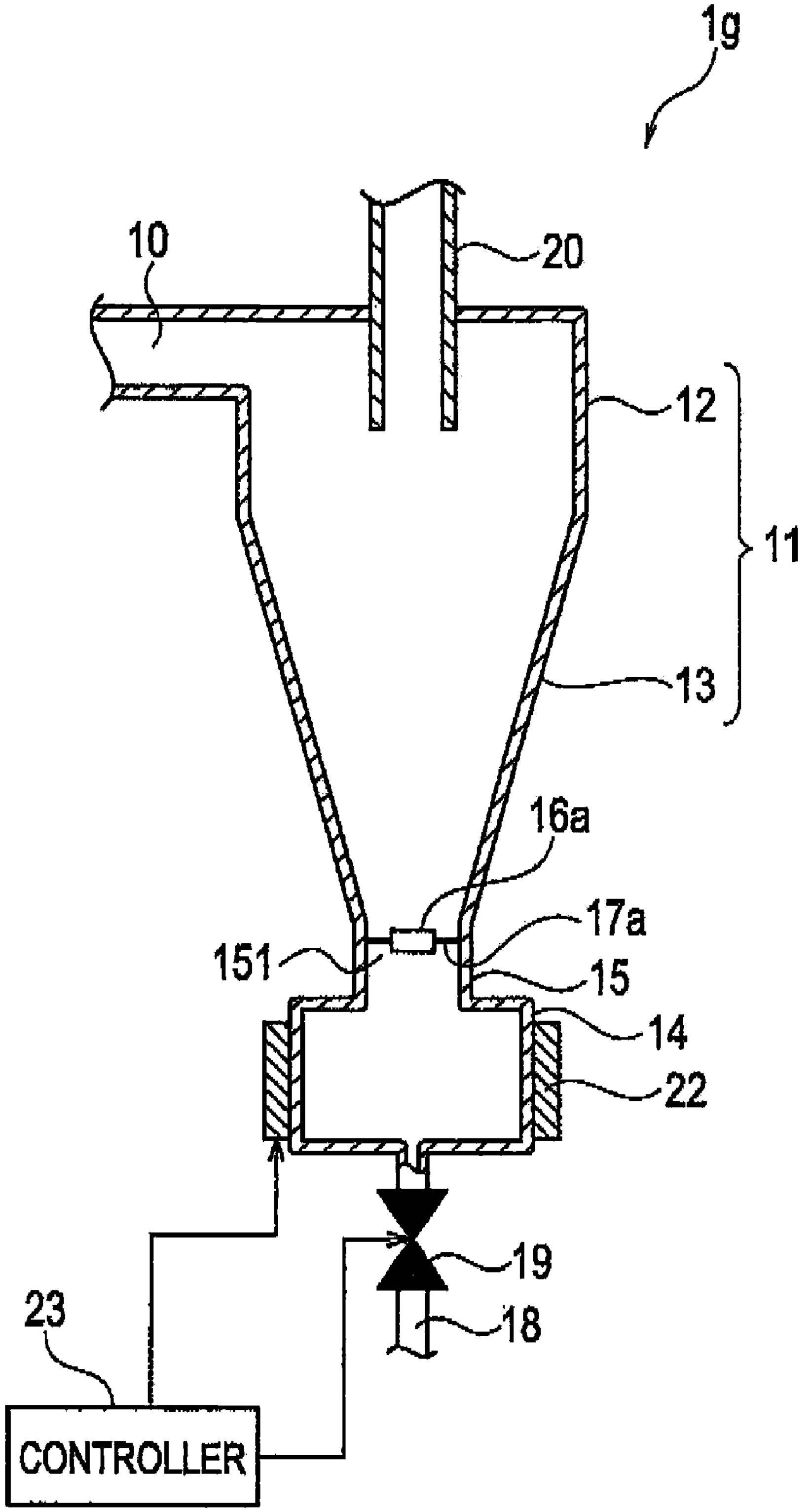
FIG. 12 is a longitudinal sectional view of a solid-liquid separator according to a fourth embodiment of the present invention.

Description is now made with reference to FIG. 12 of a solid-liquid separator 1*g* according to a fourth embodiment of the present invention. As illustrated in FIG. 12, the solid-liquid separator 1*g* is different from the solid-liquid separator 1*f* of FIG. 10, in that it has an electromagnet (or a loop of electromagnets or a solenoid) 22 arranged in place of the magnet 21, and a controller 23 adapted to control the electromagnet 22.

In the solid-liquid separator 1*f* of FIG. 10, the wall of the impurity collector 14 would have impurities remaining attracted thereon, so long as they are attracted by magnetic forces of the magnet 21, with a difficulty to rid the impurity collector 14 of an entirety of collected impurities by discharging through a discharge line 18. To this point, magnetic forces of the electromagnet 22 are controllable to turn off by the controller 23, so those impurities attracted by the electromagnet 23 and accumulated on the wall of the impurity collector 14 can be discharged through a discharge line 18.

According to the fourth embodiment in a solid-liquid separator 1*g*, an impurity collector 14 has an electromagnet 22 arranged therearound, allowing for a prevented re-mixing of impurities, and a complete discharge of collected impurities through a discharge line 18.

(Fifth Embodiment)

Figure 13:
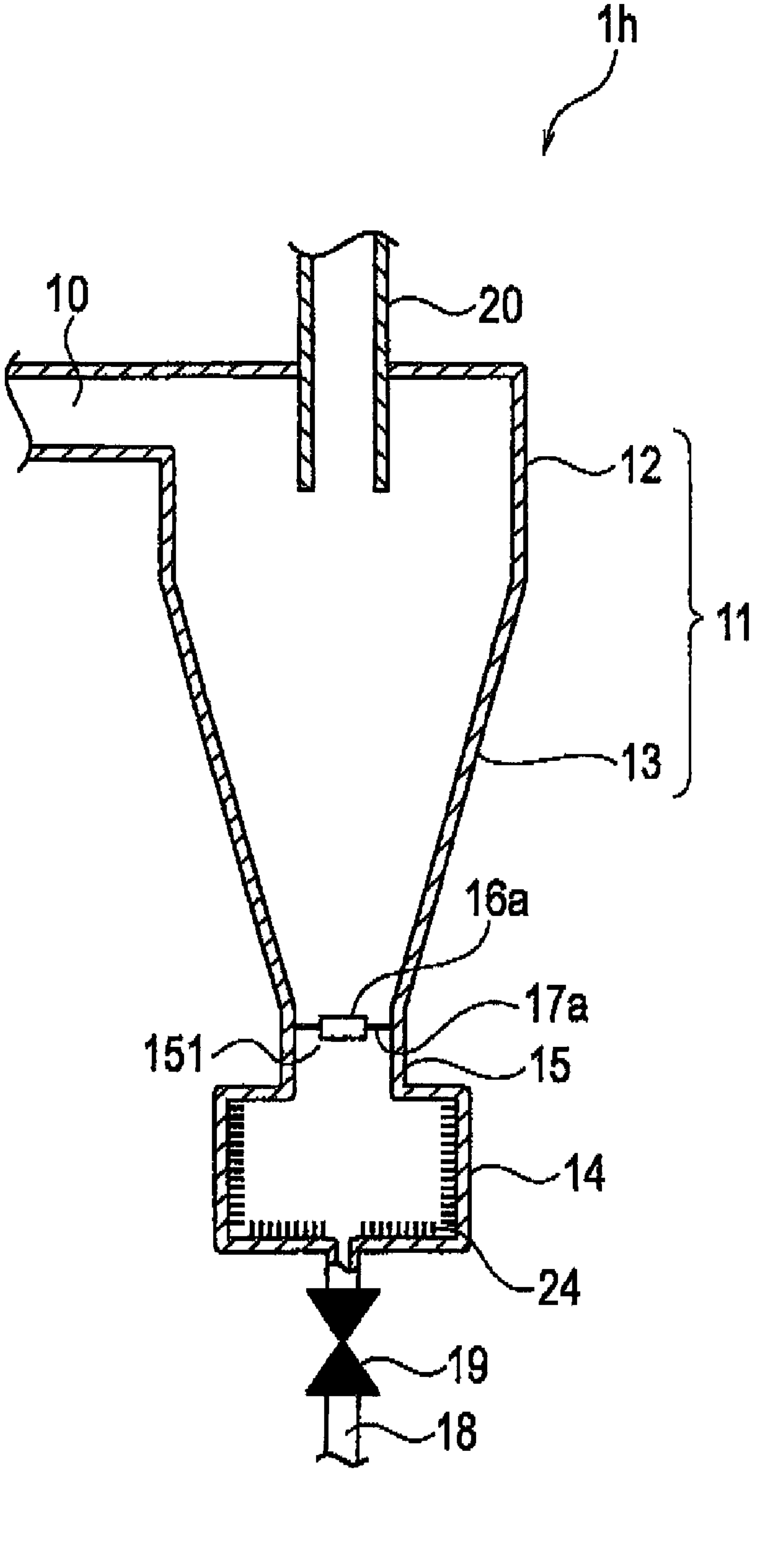
FIG. 13 is a longitudinal sectional view of a solid-liquid separator according to a fifth embodiment of the present invention.

Description is now made with reference to FIG. 13 of a solid-liquid separator 1*h* according to a fifth embodiment of the present invention. As illustrated in FIG. 13, the solid-liquid separator 1*h* is different from the solid-liquid separator 1*a* of FIG. 1, in that it has pieces of cloth or fibers 24 glued on or adhering to the wall of an impurity collector 14.

Impurities having entered the impurity collector 14 collide on fibers 24 adhering to the wall of the impurity collector 14, when they have smaller repulsive forces acting thereon than when colliding on a wall face free of fibers, so they have a suppressed flow rate in the impurity collector 14, resulting in a reduced roll-up of impurities, allowing for an effective prevention of a re-mixing of impurities. Fibers used may be raised fibers such as on towel or carpet.

According to the fifth embodiment in a solid-liquid separator 1*h*, an impurity collector 14 has fibers adhering to an inner periphery thereof, allowing for a prevented re-mixing of impurities.

(Sixth Embodiment)

Figure 14:
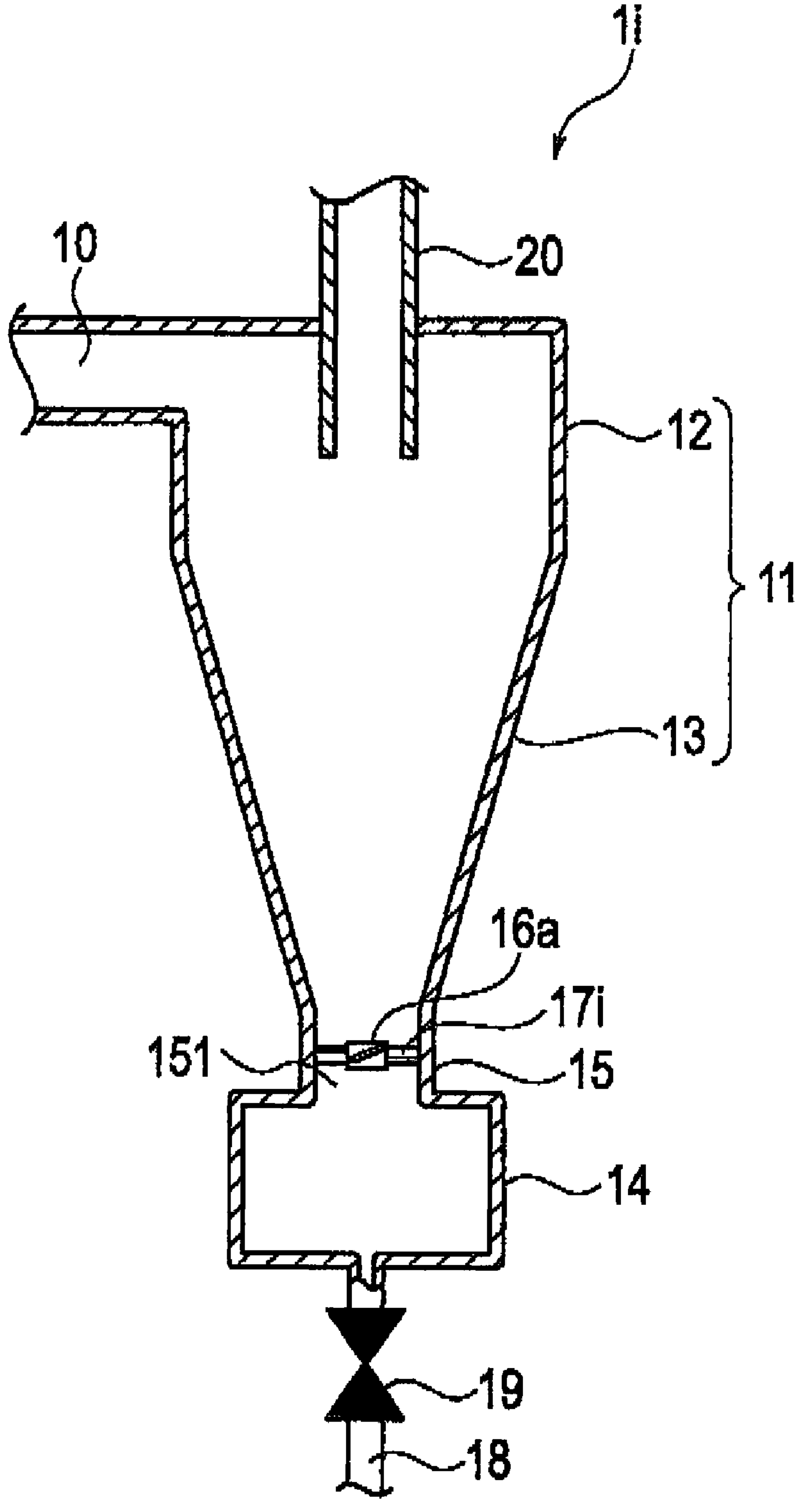
FIG. 14 is a longitudinal sectional view of a solid-liquid separator according to a sixth embodiment of the present invention.

Description is now made with reference to FIGS. 14, 15A, 15B, 16A to 16E, and 17 of a solid-liquid separator 1*i* according to a sixth embodiment of the present invention. As illustrated in FIG. 14, the solid-liquid separator 1*i* is different from the solid-liquid separator 1*a* of FIG. 1, in that it has an obstacle 16*a* held by a holder 17*i* substituting for the 17*a*.

As illustrated in FIG. 15, the holder 17*i* is composed of planer sector baffles, unlike the 17*a* made of wire elements. Moreover, the holder 17*i* is inclined relative to the obstacle 16*a*.

Figure 15A:
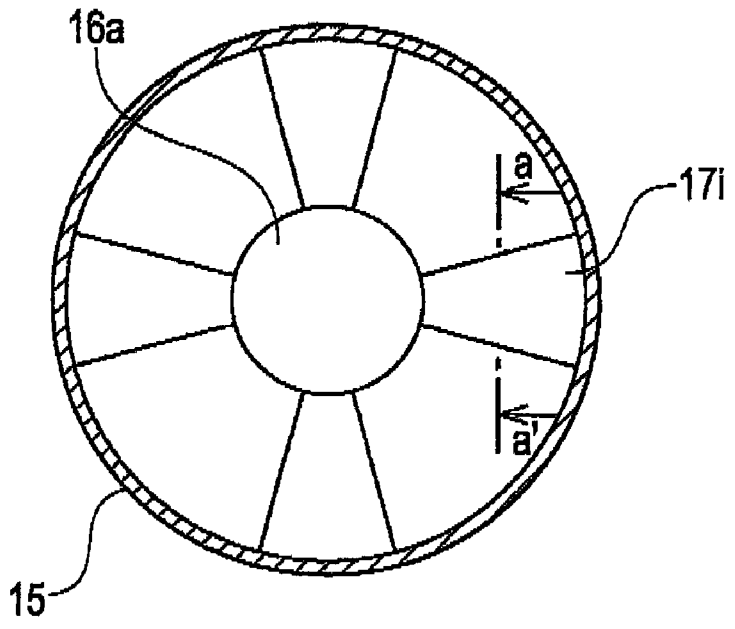
FIG. 15A is a cross-sectional view of a connecting portion of the solid-liquid separator of FIG. 14, with appearance of an obstacle, and FIG. 15B, a perspective view of the obstacle.

Assuming impurities as having breakable structures, when they collide on a holder, if this were the holder 17 made of wire elements as illustrated in FIG. 1, forces acting on them from the holder 17*a* would be concentrated in part and intensified, resulting in breakage of impurities. To this point, as illustrated in FIG. 15A, the holder 17*i* is composed of planer sector baffles, and when impurities collide thereon, forces acting on them from the holder 17*i* are dispersed, so that impurities are kept from being broken.

Figure 15B:
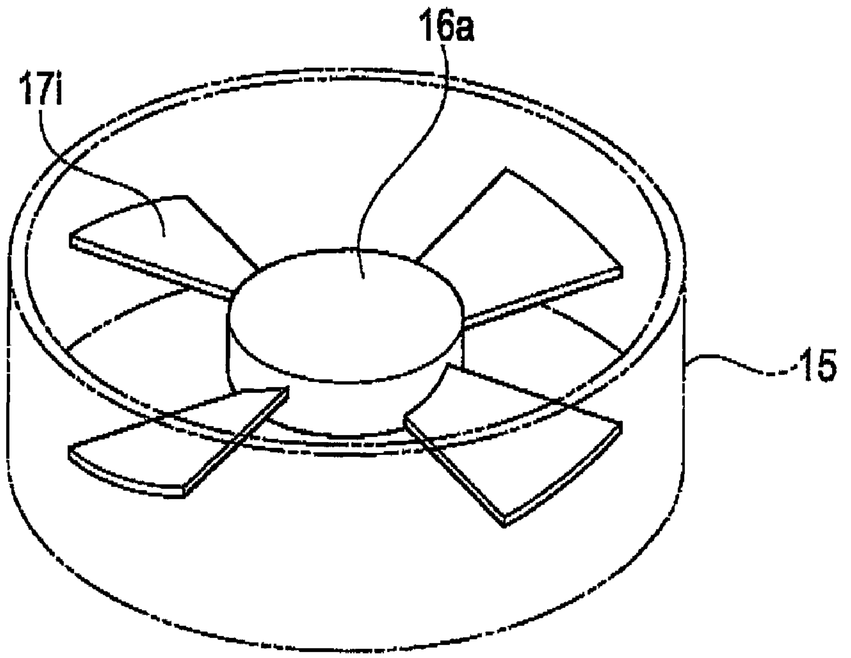

Further, as illustrated in FIG. 15B, the planer sector baffles are inclined, so that as illustrated in FIG. 17, streams f1 of impurities being discharged from a liquid cyclone 11 as well as streams f2 of impurities rolling or backing up from an impurity collector 14 are baffled to go in directions of arrows f3 and f4 to enter the impurity collector 14, thus preventing a re-mixing of impurities.

In this connection, each baffle of the holder 17*i* may well have selective one of five sectional forms illustrated in FIGS. 16A to 16E, in accordance with, among others, impurity flow and structure, and raw water flow.

According to the sixth embodiment, in a solid-liquid separator 1*i*, a holder 17*i* is composed of planer baffles, allowing for impurities spun down from a liquid cyclone 11 to smoothly transfer to an impurity collector 14. Moreover, provision of the planer baffles in a discharge port 151 permits an effective prevention against a re-mixing of impurities.

(Seventh Embodiment)

Figure 18:
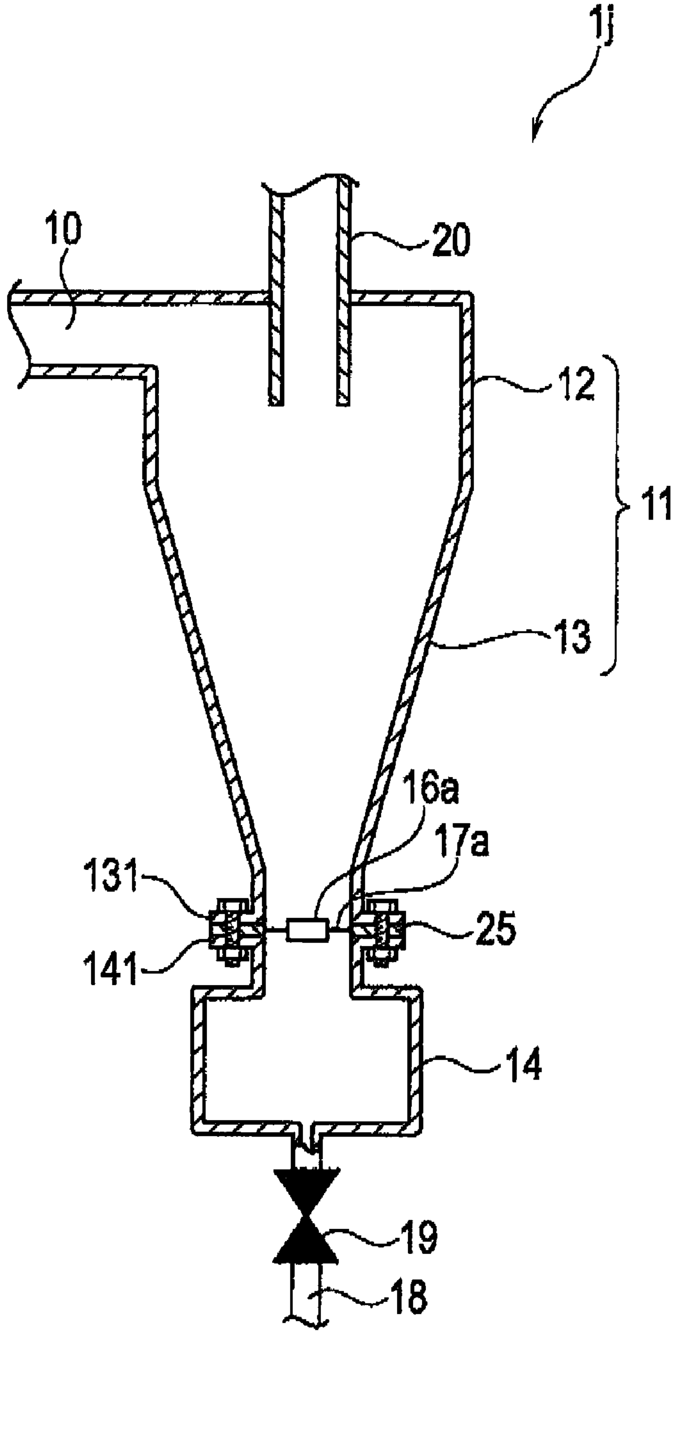
FIG. 18 is a longitudinal sectional view of a solid-liquid separator according to a seventh embodiment of the present invention.
Figure 19A:
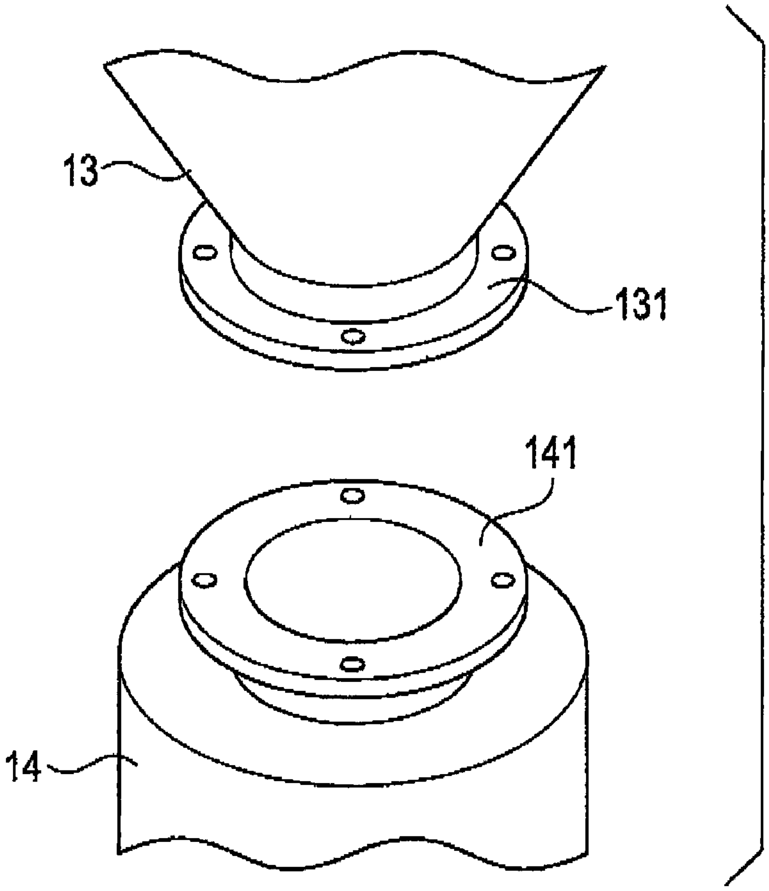
FIG. 19A is an exploded perspective view of an essential portion of the solid-liquid separator of FIG. 18, and FIG. 19B, a perspective view of a connecting portion with an obstacle of the solid-liquid separator of FIG. 18.
Figure 19B:
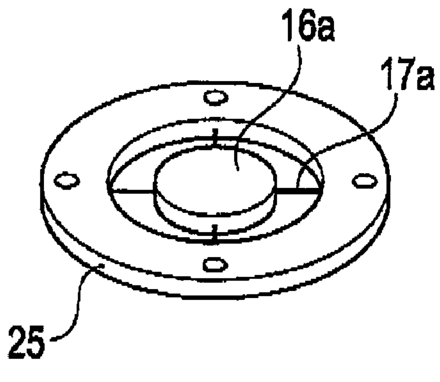

Description is now made with reference to FIGS. 18, 19A, and 19B of a solid-liquid separator 1*j* according to a seventh embodiment of the present invention. As illustrated in FIG. 18, the solid-liquid separator 1*j* is different from the solid-liquid separator 1*a* of FIG. 1, in that it has a separable connecting portion 25. More specifically, as illustrated in FIGS. 18, 19A, and 19B, the connecting portion 25 is configured as a distance member separable from between a face of an upper flange 131 as a flanged bottom end of a taper portion 13 of a liquid cyclone 11, and a face of a lower flange 141 as a flanged top end of an impurity collector 14.

As illustrated in FIG. 18, the solid-liquid separator 1*j* is assembled by fastening together the upper flange 131 and the lower flange 141 by use of screws or bolts, with the connecting portion 25 sandwiched in between. As illustrated in FIG. 19B, the connecting portion 25 has an obstacle 16*a* supported by a holder 17*a* in between.

The obstacle 16*a* as well as the holder 17*a* may become breakable under power of swirling raw water during a long-term service. In this respect, the connecting portion 25 is configured to be separable, so simply the obstacle 16*a* or the holder 17*a* as broken can be replaced with new one, without the need of replacing an entirety of the solid-liquid separator 1*j*.

According to the seventh embodiment, in a solid-liquid separator 1*j*, an obstacle 16*a* is supported by a connecting portion 25 interposed between a liquid cyclone 11 and an impurity collector 14, thereby allowing for a prevented re-mixing of rolled-up impurities, in addition to that a separable configuration of the connecting portion 25 allows for a facilitated maintenance of the solid-liquid separator 1*j*.

While preferred embodiments of the present invention have been described using specific terms, such description is for illustrative purposes, and it is to be understood that changes and variations may be made without departing from the spirit or scope of the following claims.

What is claimed is:

1. A solid-liquid separator for raw water supplied to separate into impurities and treated water, the solid-liquid separator comprising:
   - a liquid cyclone configured for inflowing raw water containing impurities as targets of collection to be forced to swirl inside to spin down impurities contained in raw water;
   - an inflow pipe connected with an upper portion of the liquid cyclone to supply the liquid cyclone with raw water, and configured for supplied raw water to be forced to swirl inside the liquid cyclone;
   - a connecting portion connected with a lower portion of the liquid cyclone, and configured with a discharge port to discharge spun down impurities from the liquid cyclone;
   - an impurity collector connected to the liquid cyclone with the connecting portion in between, having fibers adhering to a wall thereof, and configured to collect impurities discharged from the liquid cyclone;

an obstacle disposed in or near the discharge port, and configured to prevent impurities collected in the impurity collector from backing up into the liquid cyclone; and an outflow pipe connected with a top portion of the liquid cyclone, and configured for raw water having got rid of impurities to outflow as treated water from the liquid cyclone.

2. The solid-liquid separator according to claim 1, wherein the obstacle is arranged to cross a center axis of the liquid cyclone, and the obstacle is held by an inclined planar holder secured to the connecting portion.

3. The solid-liquid separator according to claim 1, wherein the obstacle is arranged to cross a center axis of the liquid cyclone, and the obstacle is held by a holder made of wire elements secured to one of the connecting portion and the impurity collector.

4. The solid-liquid separator according to claim 3, wherein the obstacle is formed in a conical shape with spiral grooves.

5. The solid-liquid separator according to claim 3, wherein the connecting portion is attachable and detachable together with the holder to and from the impurity collector.

6. The solid-liquid separator according to claim 2, wherein the obstacle is formed in one of a circular shape, a conical shape, and a cylindrical shape with a conical top.

7. The solid-liquid separator according to claim 2, wherein the obstacle is formed in one of a circular shape, a conical shape, and a cylindrical shape with a conical top.

8. The solid-liquid separator according to claim 2, wherein the obstacle is formed in a conical shape with spiral grooves.

9. The solid-liquid separator according to claim 2, wherein the connecting portion is attachable and detachable together with the holder to and from the impurity collector.

10. The solid-liquid separator according to claim 1, wherein the obstacle is formed in one of a circular shape, a conical shape, and a cylindrical shape with a conical top, and the obstacle is erected on a bottom of the impurity collector, with a center axis thereof coincident with a center axis of the liquid cyclone.

11. The solid-liquid separator according to claim 1, further comprising a magnet arranged around the impurity collector.

12. The solid-liquid separator according to claim 11, wherein the magnet comprises an electromagnet.

13. A solid-liquid separator for raw water supplied to separate into impurities and treated water, the solid-liquid separator comprising:

a liquid cyclone configured for inflowing raw water containing impurities as targets of collection to be forced to swirl inside to spin down impurities contained in raw water;

an inflow pipe connected with an upper portion of the liquid cyclone to supply the liquid cyclone with raw water, and configured for supplied raw water to be forced to swirl inside the liquid cyclone;

a connecting portion connected with a lower portion of the liquid cyclone, and configured with a discharge port to discharge spun down impurities from the liquid cyclone;

an impurity collector connected to the liquid cyclone with the connecting portion in between, and configured to collect impurities discharged from the liquid cyclone;

a conical obstacle formed with spiral grooves held horizontal by a holder made of wire elements, co-centered with and disposed in or near the discharge port, having a center thereof on a center axis of the liquid cyclone, and configured to prevent impurities collected in the impurity collector from backing up into the liquid cyclone; and an outflow pipe connected with a top portion of the liquid cyclone, and configured for raw water having got rid of impurities to outflow as treated water from the liquid cyclone.

* * * * *

UNITED STATES PATENT AND TRADEMARK OFFICE

CERTIFICATE OF CORRECTION

PATENT NO. : 8,252,179 B2
APPLICATION NO. : 12/541017
DATED : August 28, 2012
INVENTOR(S) : Aoki et al.

It is certified that error appears in the above-identified patent and that said Letters Patent is hereby corrected as shown below:

Title page, Item (57), in the Abstract, line 13, change “port, ,” to --port, and--.

In the Claims:

Claim 6, column 9, line 23, change “claim 2” to --claim 3--.

Signed and Sealed this
Sixteenth Day of July, 2013

Teresa Stanek Rea
*Acting Director of the United States Patent and Trademark Office*